(No Model.)
G. A. SETZER.
WATER COIL BOILER.
No. 444,399. Patented Jan. 6, 1891.
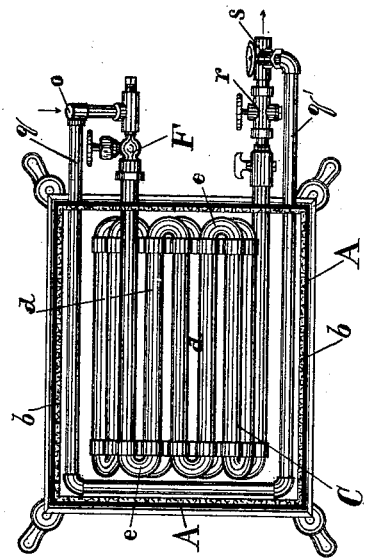
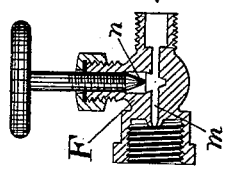
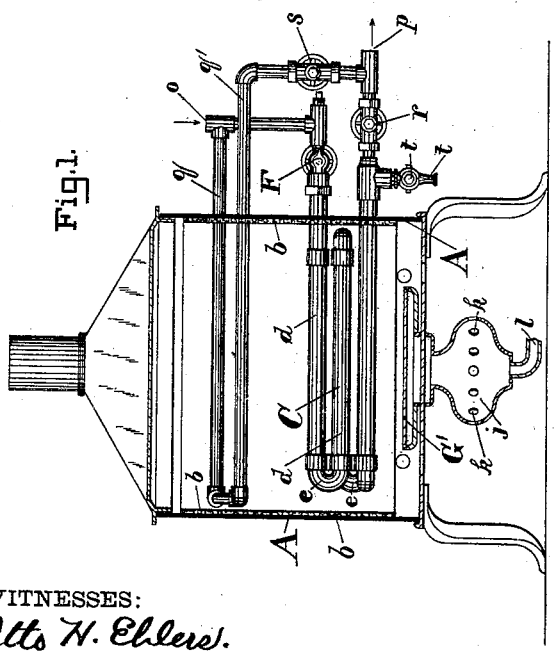
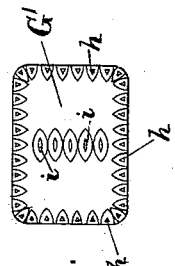
WITNESSES:
Otto H. Ehlers.
A. O. Babendreier.
INVENTOR:
G. A. Setzer
BY Chas B. Mann
ATTORNEY.

UNITED STATES PATENT OFFICE.

GUSTAV A. SETZER, OF BALTIMORE, MARYLAND, ASSIGNOR TO MARY C. SETZER, OF SAME PLACE.

WATER-COIL BOILER.

SPECIFICATION forming part of Letters Patent No. 444,399, dated January 6, 1891.

Application filed August 21, 1890. Serial No. 362,593. (No model.)

*To all whom it may concern:*

Be it known that I, GUSTAV A. SETZER, a citizen of the United States, residing at Baltimore, in the State of Maryland, have invented certain new and useful Improvements in Water-Coil Boilers, of which the following is a specification.

This invention relates to a portable apparatus for heating water and making steam, with means for controlling the action of the same. The apparatus is designed for flushing, cleaning, and cooling the pipes of beverage-drawing apparatus, such as beer-pipes, also for steaming oysters and providing steam for steam baths, steaming milk-cans, and other purposes.

The invention is shown in the accompanying drawings, in which—

Figure 1 is a vertical section of the apparatus. Fig. 2 is a horizontal section of the same. Fig. 3 is a view of the top plate of the burner. Fig. 4 is a section of the valve for controlling the supply of water.

The parts are inclosed in a sheet-metal case A, which has an asbestus or brick lining $b$. The shape or size of the case is immaterial.

I use a horizontal coil-pipe C in which to heat the water and generate steam. This heating-coil comprises a series of straight lengths or sections $d$, united by return-bends $e$. By having the coils $d$ $e$ placed in a horizontal plane and providing a burner from which a series of flame-jets will issue, said jets being also in a horizontal plane and directly under the coils, the latter will be thoroughly heated. The valve F controls the supply of water to the heater. The burner has a broad top plate G', provided with rim-apertures $h$ and a central row of apertures $i$. Attached to the lower side of the burner is a globular case $j$, having side holes $k$ for the inlet of air and a bottom connection $l$ for gas. The gas passes into the chamber of the case $j$, where it mixes with air, and the mixture of gas and air passes to the apertures $h$. Each of these apertures produces a jet-flame of the blue or Bunsen character. The valve F has a small spray-aperture $m$ direct through it, which is controlled by a valve-point $n$. The needle-valve may be opened to allow a small stream or spray of water to pass to the pipes of the heater C for the purpose of rapidly generating steam. The end of the pipe designated $o$ is the water inlet or supply, and the end designated $p$ is the steam-outlet. A by-pass or shunt pipe $q$ connects with the inlet-pipe $o$ outside of the valve F and enters the case A at a higher point than the heater C and passes out of the case at $q'$ and connects with the outlet-pipe $p$ at a point outside of the cut-off valve $r$. This by-pass pipe has a cut-off valve $s$ near its junction with the outlet-pipe. A drain-nozzle $t$ is provided having a cock $t'$.

The operation of this device will be readily understood. After using the heater-pipe C to supply either steam or hot water for any purpose desired, if such purpose be for cleaning beer-pipes, the next step will be to cool the said beer-pipes. This may be done by closing the valve F and the cut-off valve $r$ and opening the cut-off valve $s$ in the by-pass pipe, whereupon the cold water will flow through the by-pass pipe $q$ into the beer-pipes without passing through the coil C, and thereby avoid chilling the pipes composing the coil C. By this arrangement the heater-coil of the apparatus is kept hot and in readiness to at once cleanse another set of beer-pipes.

I may vary the construction of some of the parts here shown.

Ordinarily city-manufactured gas may be used to supply the burner, or it may be supplied by gas from gasoline.

Having described my invention, I claim—

A portable apparatus for heating water, having in combination a case A, a series of sections $d$ of heating-pipes united by return-bends and placed side by side in a horizontal plane, and having an inlet $o$, controlled by a valve F, which is provided with a spray-aperture $m$ to cause a spray of water to pass into the heating-pipes, an outlet $p$, provided with a cut-off valve $r$, a burner below the said heating-pipes, a shunt-pipe $q$, connecting with the said inlet at a point outside of the valve F and with the outlet $p$ at a point outside of the cut-off valve $r$, and a cut-off valve $s$ in said shunt-pipe, all arranged for the purpose specified.

In testimony whereof I affix my signature in the presence of two witnesses.

GUSTAV A. SETZER.

Witnesses:
A. O. BABENDREIER,
JNO. T. MADDOX.